United States Patent
Huynh et al.

(10) Patent No.: US 11,106,903 B1
(45) Date of Patent: Aug. 31, 2021

(54) OBJECT DETECTION IN IMAGE DATA

(71) Applicant: Amazon Technologies, Inc., Seattle, WA (US)

(72) Inventors: Cong Phuoc Huynh, Sunnyvale, CA (US); Mashhour Solh, San Jose, CA (US); Tiantong Guo, State College, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 173 days.

(21) Appl. No.: 16/179,640

(22) Filed: Nov. 2, 2018

(51) Int. Cl.
 *G06K 9/00* (2006.01)
 *G06K 9/46* (2006.01)
 *G06K 9/62* (2006.01)

(52) U.S. Cl.
 CPC ....... *G06K 9/00369* (2013.01); *G06K 9/4642* (2013.01); *G06K 9/4652* (2013.01); *G06K 9/6234* (2013.01); *G06K 9/6262* (2013.01)

(58) Field of Classification Search
 CPC ....................................................... G06K 9/46
 See application file for complete search history.

(56) References Cited

U.S. PATENT DOCUMENTS

| | | | |
|---|---|---|---|
| 2019/0130212 A1* | 5/2019 | Cheng | G06N 3/0445 |
| 2019/0279009 A1* | 9/2019 | Srirangam Narashiman | G06K 9/2018 |
| 2019/0286950 A1* | 9/2019 | Kiapour | G06F 16/9535 |
| 2020/0242355 A1* | 7/2020 | Kim | G06K 9/6256 |

* cited by examiner

*Primary Examiner* — Wen W Huang
(74) *Attorney, Agent, or Firm* — K&L Gates LLP

(57) ABSTRACT

Techniques are generally described for object detection in image data. A first frame of image data associated with a first domain is received by a detector executing on at least one computing device. The detector generates a first feature data in the first domain. The first feature data is transformed from the first domain into a second feature data in a second domain. The detector may be effective to detect objects in the second domain. A location of an object in the first frame of image data is determined based at least in part on the second feature data.

20 Claims, 11 Drawing Sheets

OBJECT DETECTION IN IMAGE DATA

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. Image data generated by cameras and/or by computing devices may be processed to determine characteristics of the area of interest being recorded, such as for detecting motion or movement in the recorded areas. Additionally, computer vision techniques may be used to detect the presence of certain objects in the scene represented by the image data.

DETAILED DESCRIPTION

Figure 1:
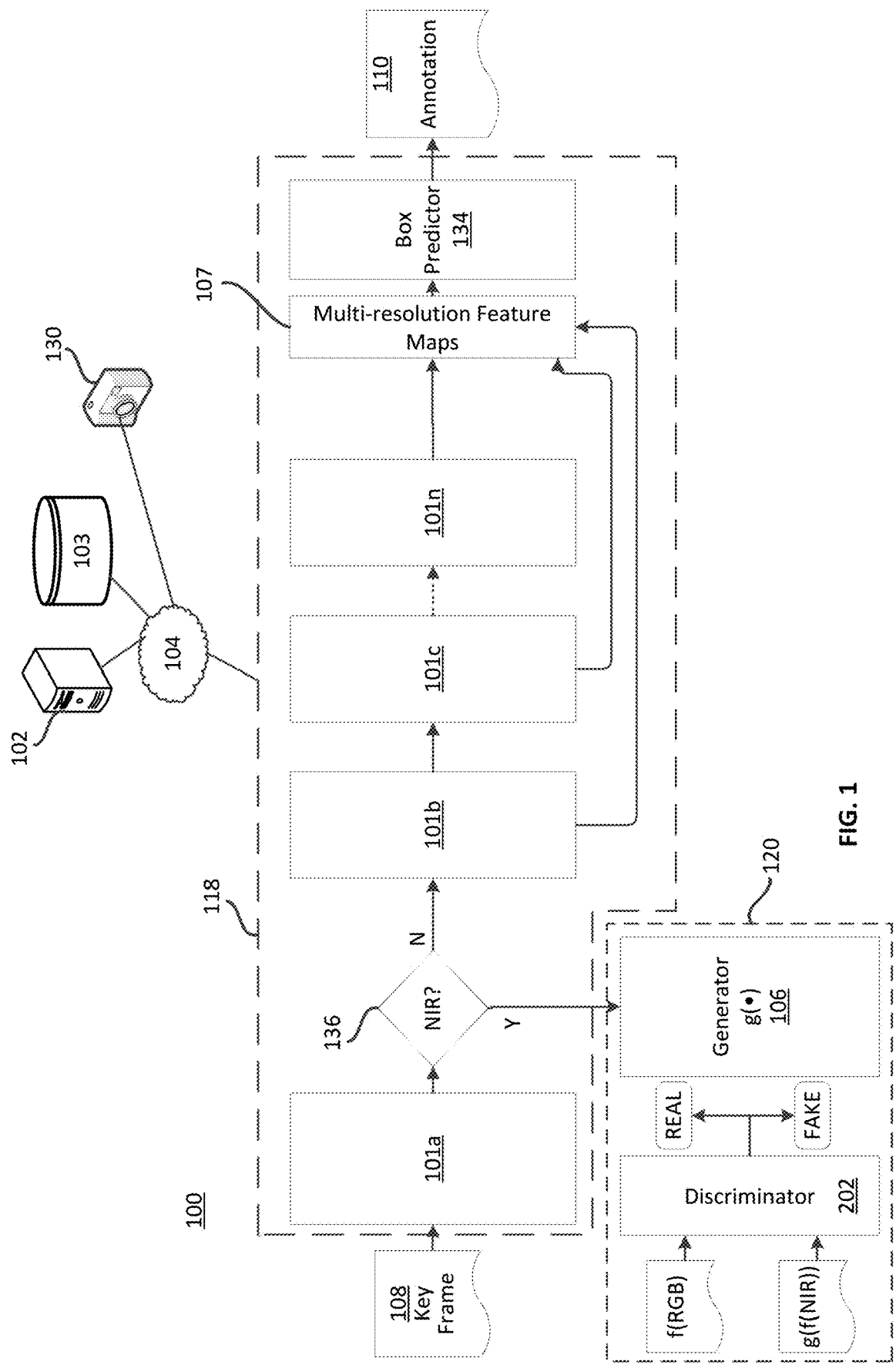
FIG. 1 is a block diagram showing an example system effective to generate synthetic feature data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various examples, deep learning techniques may be used to detect objects in image data. Convolutional neural networks (CNNs), single shot detectors (SSDs), region-convolutional neural networks (R-CNNs), Faster R-CNN, Region-based Fully Convolutional Networks (R-FCNs) and other machine learning models may be trained to perform object detection and classification. Training an SSD, or other machine learning models, typically requires annotated training data (e.g., annotated frames of image data). Annotated training data comprises labeled image data including data representing bounding boxes that identify the location of objects represented in the image data and classification data identifying a class of the object (e.g., data representing "cat", "dog", "human", etc.). As used herein, a location of an object in a frame of image data refers to a region within the frame in which the object is represented. Locations may be represented by bounding boxes surrounding the locations of objects. Image data (e.g., frames of image data) and/or feature data extracted from image data may be annotated or unannotated.

In various examples, large datasets comprising annotated training data (e.g., labeled image data) exist and may be used to train various computer vision models, such as the object detection models described above. However, such datasets typically comprise RGB (red, green, blue) image data representing image data in the visible light spectrum. Training object detection models to detect objects in other modalities apart from the visible light spectrum may be time consuming and difficult due to the fact that large datasets of annotated training data are typically not available outside the visible spectrum. Generation of training data may be time consuming because it may require manual annotation of image data by defining bounding boxes identifying the location of various objects as well as classification of those objects. However, described herein are techniques that may be used to leverage currently available datasets to train object detection models, even when the modality of the training data is different from the modality of the object detection model. For example, various techniques are described to convert annotated (e.g., labeled) RGB data to synthetic annotated data in a different portion of the electromagnetic spectrum (e.g., synthetic infrared data) in order to train models to detect objects in such portions of the spectrum (e.g., infrared or near-infrared). In various other examples, image data in a non-visible portion of the spectrum may be converted to synthetic visible image data (e.g., RGB image data) and provided to a model trained using available annotated datasets in the visible spectrum (e.g., an RGB SSD) for object detection. In some further examples, techniques for refining synthetic, non-visible data are generally described, using gray-scaling, image segmentation, and alpha-blending techniques to improve the quality of the synthetic, non-visible data.

Additionally, in some examples, generators may be trained to transform non-visible feature data into synthetic feature data in the visible domain. Feature data may describe a particular component of image data in a particular feature space. For example, in an object detector, a feature vector may describe the size and location of a bounding box that forms the bounds of an object represented in the image data. Similarly, another feature vector of an object detector may be a classification (e.g., an identification) of an object in the image data. In various examples such generators may be trained jointly along with an SSD model, or other object detector. Accordingly, the synthetic feature data in the visible domain may be provided to a classifier of the SSD model for object detection. Such a technique avoids the need to train a separate classifier in the non-visible domain, which may require a large dataset of non-visible training data to be generated. Additionally, extraction and conversion of feature data, as opposed to entire frames of image data, may serve as a form of encryption that may be used to address privacy issues, as feature vectors may be stored and/or transmitted without risk of the original image data being compromised. Generally, although feature vectors may be referred to herein, the various techniques described below may instead use (or additionally use) feature maps. Accordingly, as used herein, feature data may refer to either feature vectors, feature maps, or some combination thereof.

In various examples, generative adversarial networks (GANs) may be trained using the various techniques described herein to generate synthetic image data and/or feature data. In GANs, a generator is trained to generate synthetic image data based on input image data. The generator is trained to map data from a latent space to a particular data distribution of interest (e.g., from RGB image data to near infrared image data). A discriminator is used to discriminate between images from the true distribution (e.g., from real near infrared image data) and synthetic image data produced by the generator. The training goal of the generator is to increase the error rate of the discriminator (e.g., to generate synthetic image data that appears to be of the true distribution). Back propagation is used in both the generator and the discriminator networks so that the quality of synthetic image data produced by the generator is increased while the discriminator network becomes better at distinguishing between true data and synthetic data produced by the generator. In various examples, the generator may be a deconvolutional neural network and the discriminator may be a CNN.

As described herein, synthetic or "fake" data may refer to data generated by a generator of a GAN that is of a different domain relative to the data input into the GAN. For example, RGB image data may be input to a trained generator. Conversely, data input to a trained generator for transformation may be referred to herein as "real" (e.g., input RGB image data). The trained generator may convert or transform the RGB image data into synthetic near infrared ("NIR") image data. The terms "synthetic" and "fake" may be used interchangeably in this context. In various embodiments described below, data may be described as being transformed from the NIR domain to the RGB domain and/or from the RGB domain to the NIR domain. However, a person having ordinary skill in the art would understand that the techniques described herein may be used to transform data between any two domains of interest. Accordingly, transformation of data between the RGB domain and NIR domain may serve as an example embodiment although the techniques may generally be applicable to other domains apart from those specifically described. For example, image data may be transformed to and from the far infrared domain, the ultraviolet domain, thermal infrared domain, visible spectrum, etc. In general, the techniques described herein may be useful when one domain has readily available annotated datasets for use in training detectors (e.g., RGB domain) while another domain of interest is more limited in the amount of readily available annotated training data.

FIG. 1 is a block diagram showing an example system 100 effective to generate synthetic feature data, arranged in accordance with various aspects of the present disclosure. In various examples, system 100 may comprise a detector 118, a GAN 120, a generator 106. Generally, after training (e.g., during runtime or "inference"), detector 118 may be effective to receive input image data 108 (e.g., a key frame) and generate an annotation 110 for the input image data. The annotation 110 may depend on the type of detector 118 and how the detector has been trained. For example, detector 118 may be an SSD trained to locate image data (e.g., groupings of pixels) representing humans in a frame of image data. Accordingly, annotation 110 may be bounding boxes identifying image data representing humans in input image data 108. The foregoing example is for illustrative purposes only. Other types of detectors may instead be used apart from human detectors. In various examples, detector 118 may be effective to locate and/or classify various objects depicted in a frame of image data. For example, detector 118 may be effective to locate objects representing cats and dogs within frames of image data and may be effective to classify located objects as either cats, dogs, or neither.

In various examples, detector 118 may be trained to detect objects in a particular domain or modality. For example, detector 118 may be effective to detect objects in RGB image data. A traditional detector trained to perform object detection in the RGB domain may be unable to detect objects in other domains, such as NIR, or other non-visible domains. However, as described herein, a generator 106 may be trained using a GAN 120, in accordance with various techniques described in further detail below, to transform feature data extracted from image data of a first domain into feature data in a second domain for which the classifier of detector 118 has been trained. For example, the classifier of detector 118 (e.g., box predictor 134) may be trained to detect objects in the RGB domain. Detector 118 may receive a frame of input image data 108 that is in the NIR domain. Feature data may be extracted from the input NIR image data at a particular block or level of the detector 118. At action 136 a determination may be made whether or not the extracted feature data are in the NIR domain (as opposed to the RGB domain for which the detector 118 has been trained). If the extracted feature vector is an RGB feature vector, the RGB feature vector may be passed to the next block of the detector 118 (e.g., the next block relative to the point at which the feature vector was extracted). The detector 118 may continue to process the input feature data in accordance with the particular implementation of the detector. For example, the RGB feature vectors or maps (real or synthetic) may be passed to one or more hidden layers of the detector 118, such as the inception blocks 1, 2, . . . , N depicted in FIG. 1. The box predictor 134 may be an output layer of detector 118 effective to detect one or more objects represented by the feature data and may output annotated data describing the bounding boxes that locate and/or classify relevant detected objects in the scene.

Conversely, if a determination is made that the feature data are in the NIR domain, the NIR feature data may be sent to generator 106 for transformation into synthetic RGB feature data. Generator 106 and detector 118 may be jointly trained in accordance with the techniques described in further detail below in reference to FIGS. 2-6. As described in further detail below, generator 106 may be effective to transform the NIR feature data into realistic, synthetic RGB feature data. The synthetic RGB feature data may be returned to detector 118 by passing the synthetic RGB feature vector to the next block of the detector 118 (e.g., the next block relative to the point at which the feature vector was extracted for transformation). The detector 118 may continue to process the input feature data in accordance with the particular implementation of the detector. The box predictor may detect one or more objects represented by the synthetic RGB feature data and may output annotated data describing the bounding boxes that locate and/or classify relevant detected objects in the scene.

Accordingly, the system depicted in FIG. 1 is able to perform object detection in two different domains (e.g., in the visible, RGB domain, and in the NIR domain). Additionally, since annotated training data is widely available for the RGB domain, conversion of NIR feature data into semantically-realistic, synthetic RGB feature data avoids the difficulty of generating and/or acquiring large amounts of annotated IR feature data to train an NIR-based detector. Further, transformation and/or use of feature data for object detection may alleviate privacy concerns as the original image data may not be reproducible from the feature vector data.

In various examples, computing device(s) 102 may be effective to implement detector 118, GAN 120, and/or generator 106. In various examples, computing device(s) 102 may be configured in communication such as over a network 104. Network 104 may be a wide area network, such as the internet, a local area network, and/or some combination thereof. Additionally, in various examples, computing device(s) 102 may be configured in communication with a non-transitory, computer-readable memory 103. Non-transitory, computer-readable memory 103 may be effective to store one or more instructions that, when executed by at least one processor of computing device(s) 102, program the at least one processor to perform the various techniques described herein. In various examples, system 100 may comprise a camera 130. Camera 130 may comprise one or more image sensors effective to generate image data representing a scene. In various examples, camera 130 may be effective to capture visible (e.g., RGB) image data and/or infrared image data. For example, camera 130 may be a home security camera effective to capture RGB image data when lighting conditions allow and NIR image data in low light conditions. In various examples, one or more processors of camera 130 may be effective to implement the various techniques described herein. For example, camera 130 may use various detectors described herein to detect the identity of persons within a field-of-view of the camera 130. Upon detection of an unidentified and/or unauthorized person (e.g., by detector 118 or another detector) camera 130 may send video data to one or more other computing devices for further processing and/or for playback. For example, camera 130 may be configured to monitor a home. Upon detection of an unidentified person in the home, camera 130 may stream video to a mobile device of the home owner or another person associated with the home.

Additionally, in some examples, different components of system 100 of FIG. 1 may be implemented by different devices. For example, the detector 118 may be implemented by camera 130 and generator 106 may be implemented by computing device(s) 102, or vice versa. In various examples where information is transmitted over the network 104 between different components, extraction of feature data, as described herein, may serve as a form of encryption as the feature data may not be useable to reproduce the original image data. Further, in various examples, the original image data does not need to be stored to use the various techniques described in FIG. 1, instead the feature data may be cached and used to identify bounding boxes corresponding to the input image data.

In various examples, feature vector extraction for transformation may be performed at different levels. For example, although in FIG. 1 feature vector extraction is performed prior to the first block of detector 118, in various other examples, feature vector extraction may be performed at different intermediate levels (e.g., at the output of the 2nd convolution block, the 3rd convolution block, . . . , and/or N-th convolution block). The level at which feature data are extracted may be empirically determined depending on the particular detector in order to maximize detector performance. In various examples, each layer of detector 118 may provide input into a respective bounding box predictor 134. The training goal of detector 118 is for the output of the bounding box predictors 134 to match the bounding boxes of annotated, input image data as closely as possible.

Detector 118 may comprise a multi-resolution feature map layer 107 following hidden layers 101a . . . 101n (which may be convolutional layers). Multi-resolution feature map layer 107 may receive feature maps (and/or other feature data) from each preceding layer of detector 118. The multi-resolution feature maps (or feature data) may be sent to box predictor 134. As depicted in FIG. 1, discriminator 202 may receive "real" RGB feature data (f(RGB)) and synthetic RGB image data that has been converted from NIR image data (g(f(NIR))) by generator 106. Discriminator 202 may output a binary decision as to whether the input feature data is "Real" (e.g., captured by an image sensor) or "Fake" (e.g., image data generated by generator 106).

Figure 2:
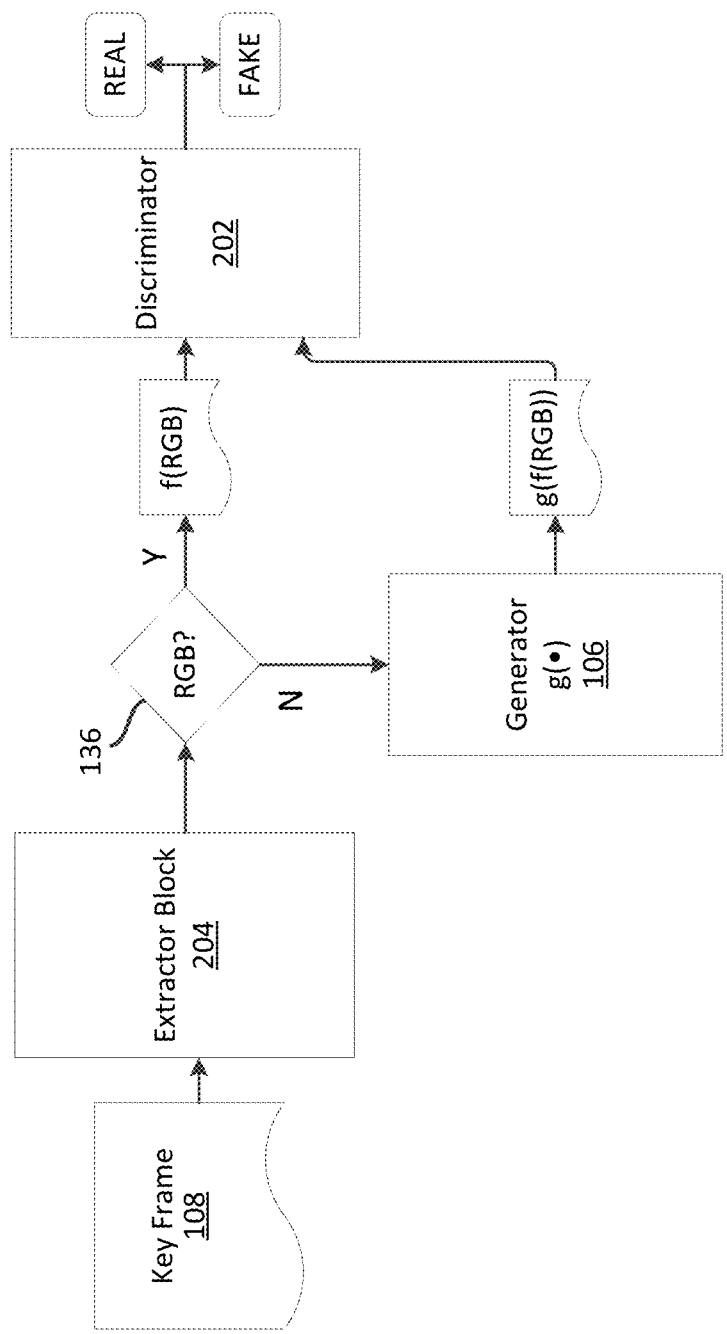
FIG. 2 is a block diagram depicting a first training stage effective to train a generator and a discriminator, in accordance with various aspects of the present disclosure.

FIGS. 2-5 generally describe a multi-stage training technique that may be used to train the system 100 of FIG. 1. Various components and/or functionalities of system 100 described above may not be repeated below for purposes of clarity and brevity. FIG. 2 is a block diagram depicting an example of a system effective to train generator 106 and discriminator 202, in accordance with various aspects of the present disclosure. Generally, FIG. 2 depicts unsupervised training of generator 106 and discriminator 202. Generator 106 may be trained using unsupervised learning techniques using unlabeled RGB feature data and unlabeled NIR feature data (e.g., unannotated feature data). In an example, generator 106 may be trained to generate synthetic RGB feature data using real NIR feature data as input. The generator 106 may be trained to generate the synthetic RGB feature data by transforming input NIR feature data to synthetic feature data in the RGB domain that closely approximate data distributions of feature data in the RGB domain. Similarly, discriminator 202 may be trained using unsupervised learning techniques using unlabeled RGB feature data and unlabeled NIR feature data. Discriminator 202 may be trained to provide a binary decision as to whether an input RGB feature vector is real or fake (synthetic). The training data used to train generator 106 and/or discriminator 202 need not correspond to the same scene.

The above described training techniques may be used to stabilize the GAN 120 comprising generator 106 and discriminator 202. In the example depicted in FIG. 2, feature data are extracted at extractor block 204. Feature extraction may be performed at the extraction layer 101a or at any other level within the detector 118 (e.g., at hidden layers 101b, 101c, . . . , 101n). In FIG. 2, the layer at which the feature extraction occurs is generalized by describing the layer as the "extractor block 204". If the feature vector is an RGB feature vector, the RGB feature vector is passed to discriminator 202. Discriminator 202 makes a determination as to whether the feature vector is a real or a fake RGB feature vector. In other words, the discriminator 202 makes a determination whether the RGB feature vector was generated by the generator 106, and is thus "fake" or "synthetic", or whether the RGB feature vector was extracted from image data in the RGB domain and is thus "real". If the feature vector is an NIR feature vector, the NIR feature vector is transformed by generator 106 into a synthetic RGB feature vector. Discriminator 202 again makes a determination as to whether the feature vector is a real or a fake RGB feature vector.

Generator 106 may be implemented as a multi-layer neural network. Discriminator 202 may, in some examples, be implemented as a binary classifier or a multi-layer neural network. Back propagation (e.g., one or more feedback loops providing signals and/or other indications of data to components of system 100 and/or GAN 120) is used during training so that the generator 106 learns whether synthetic RGB data was able to "fool" the discriminator 202 into classifying the synthetic RGB data as "real". Similarly, back propagation allows discriminator 202 to determine whether data classified as "real" was, in fact, real RGB data or whether it was synthetic RGB data. Conversely, back propagation allows discriminator 202 to determine whether data classified by discriminator 202 as "fake" was, in fact, real RGB data or synthetic RGB data generated by generator 106. Generator 106 and discriminator 202 of GAN 120 may have approximately the same number of layers so that GAN 120 is balanced and neither the generator 106 nor the discriminator 202 is able to overpower the other during training.

Figure 3:
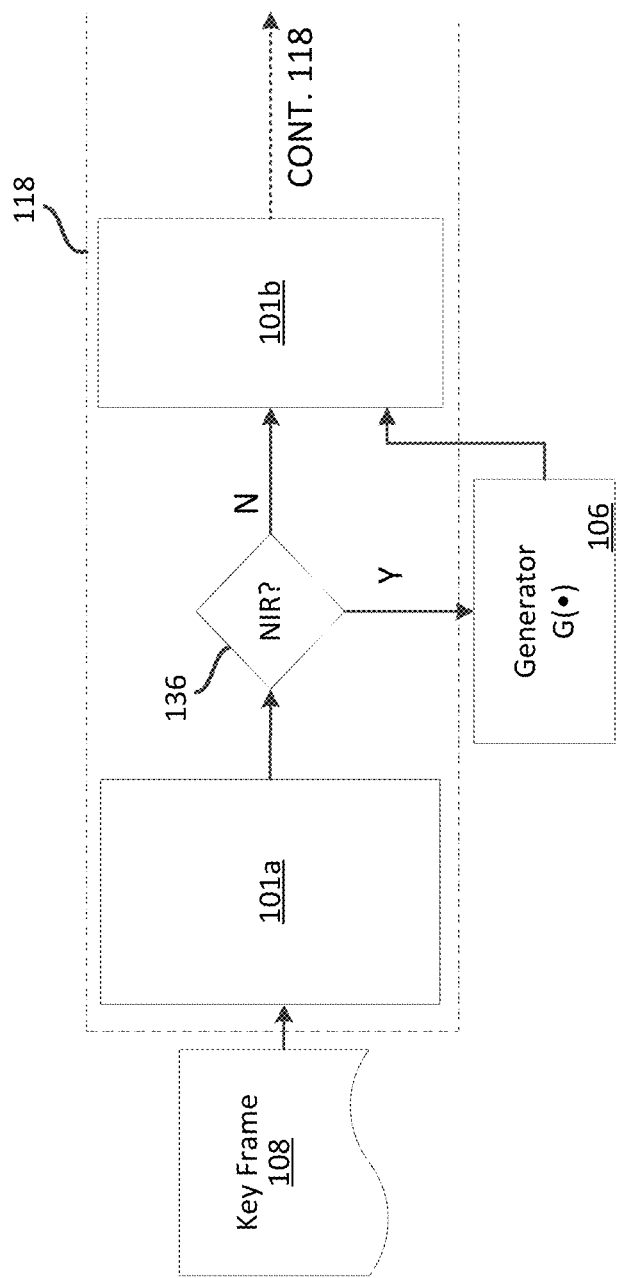
FIG. 3 is a block diagram depicting a second training stage effective to train a detector, in accordance with various aspects of the present disclosure.

FIG. 3 generally depicts fixing generator 106 and training detector 118 with fixed generator 106 in place. In FIG. 3, the generator 106, as trained by the GAN 120 (e.g., using the process described above in reference to FIG. 2) is connected to the detector 118 (FIG. 1). Generator 106 may be fixed during the training process described in FIG. 3. In other words, weights and/or biases of the generator 106 may be maintained during the training process of FIG. 3. In FIG. 3 generator 106 (trained as described in reference to FIG. 2) is used to generate synthetic RGB feature vector data from NIR feature vector data (e.g., generator 106 generates a synthetic representation of the NIR feature vector data in the RGB domain) to train the detector 118 to output annotated image data (e.g., bounding boxes and/or classifications of objects). During this training stage, the detector 118 may also receive real RGB feature data extracted from input RGB image data. Accordingly, both real RGB feature data and synthetic RGB feature data generated by the fixed generator 106 may be used to train the detector 118 during this training stage. Generally, as used herein, weights and biases of the various machine learning models described herein may be referred to as "parameters" of the machine learning models. Parameters control activations in neurons (or nodes) within layers of the machine learning models. For example, the weighted sum of activations of each neuron in a preceding layer may be input to an activation function (e.g., a sigmoid function and/or rectified linear units (ReLu) function). The result may determine the activation of a neuron in a subsequent layer. In addition, a bias value may be used to shift the output of the activation function to the left or right on the x-axis and thus may bias a neuron toward inactivation.

Figure 4:
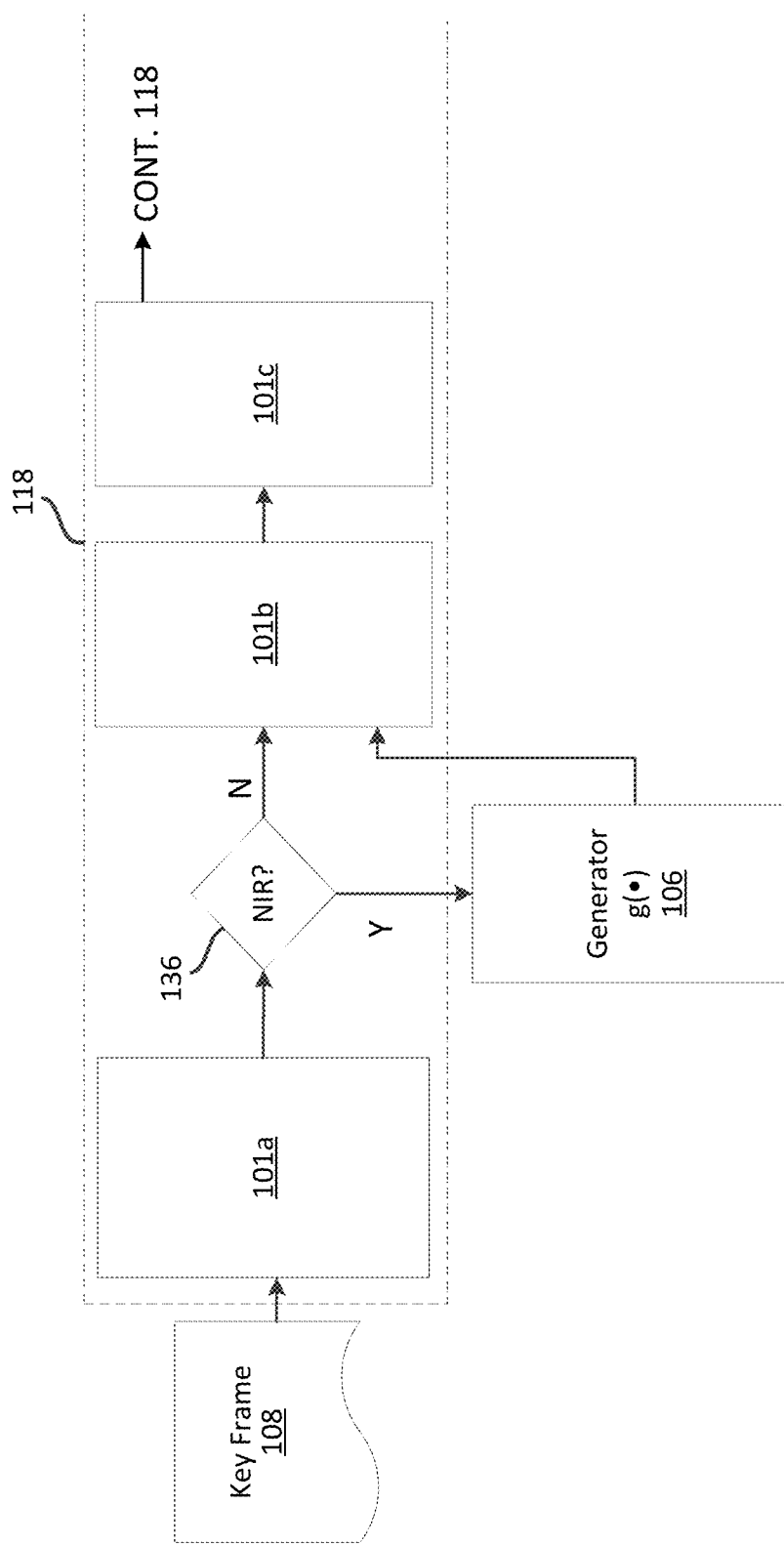
FIG. 4 is a block diagram depicting a third training stage effective to jointly train a detector and a generator, in accordance with various aspects of the present disclosure.
Figure 7:
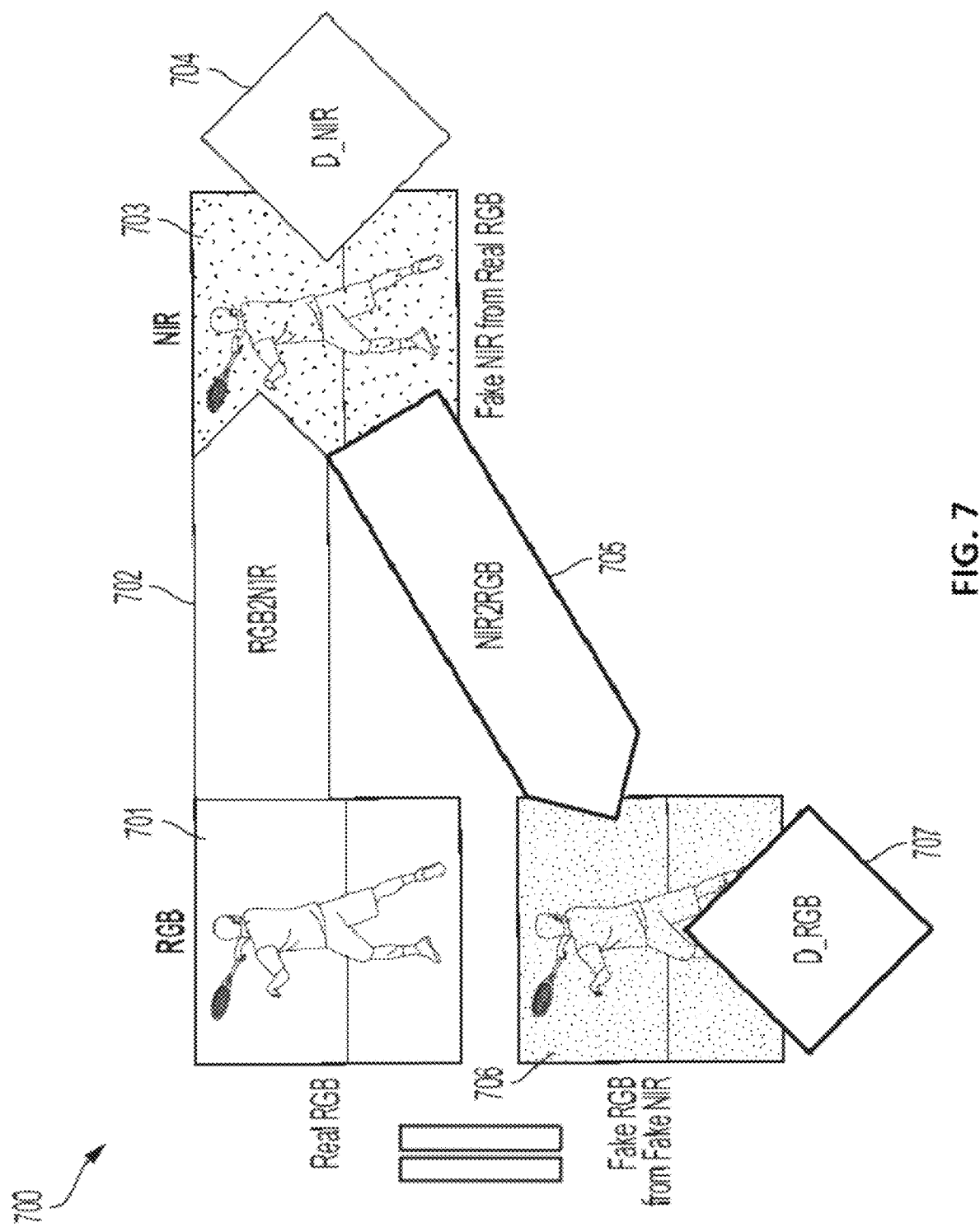
FIG. 7 is an example diagram depicting a cycle generative adversarial network used to train a generator to transform image data, in accordance with various aspects of the present disclosure.

FIG. 4 generally depicts training generator 106 and detector 118 jointly with detection (classification+localization) losses, but without regard to generative loss. In FIG. 4, generator 106 and detector 118 are trained jointly. However, the only losses used to train the generator 106 and detector 118 at this training stage are the classification loss of the detector 118 and the localization loss of the detector 118. Classification loss and localization loss may together be referred to as "detection loss". Classification loss of detector 118 may represent that the detector 118 did not correctly identify an object (e.g., the label is incorrect). For example, if detector 118 is trained to classify dogs in image data, a classification of a cat as a dog represents classification loss. In some examples, classification loss may be implemented as a softmax cross entropy loss. Localization loss represents the distance or offset (e.g., in terms of x, y coordinates or pixel addresses) between the output bounding box and the bounding box in the annotated image data. Localization loss (or "regression loss") may be represented as the squared difference between the predicted bounding box location and dimension and the annotated box location and dimension (L2-loss). In another example, localization loss may be represented as the absolute difference between the predicted bounding box location and dimension and the annotated box location and dimension (L1-loss). In various further examples, localization loss may be represented as a Huber loss function, where L2 loss is used if the difference between the predicted and annotated bounding boxes are small (e.g., less than a threshold or less than one to two standard deviations from a mean location and/or dimension), and L1 loss is used if the difference between the predicted and annotated bounding box is large (e.g., greater than a threshold and/or greater than one to two standard deviations from a mean location and/or dimension). In FIG. 4, generative loss (e.g., loss representing the difference between the transformed feature data and a distribution of real feature data of the target domain) is not used to jointly train the generator 106 and detector 118. At this stage, the training data may comprise annotated RGB image data and any available annotated NIR image data. When generator 106 generates synthetic RGB feature vector data from annotated NIR feature data, the annotation may persist in the synthetic RGB feature vector data. FIG. 7 below describes techniques for generating synthetic, annotated NIR image data that, in some examples, may be used during training of system 100.

In various examples, localization loss may be given by the equation:

$$L_{loc}(x, l, g) = \sum_{i \in Pos}^{N} \sum_{\{cx,cy,w,h\}} x_{ij}^k smooth_{L1}(l_i^m - \hat{g}_j^m)$$

$$\hat{g}_j^{cx} = (g_j^{cx} - d_i^{cx})/d_i^w \quad \hat{g}_j^{cy} = (g_j^{cy} - d_i^{cy})/d_i^h$$

$$\hat{g}_j^w = \log\left(\frac{g_j^w}{d_i^w}\right) \quad \hat{g}_j^h = \log\left(\frac{g_j^h}{d_i^h}\right)$$

The localization loss is a Smooth L1 loss between the predicted box (l) and the annotated box (g) parameters. Regression is applied to offsets for the center (cx, cy) of the default bounding box (d) and for its width (w) and height (h).

In various examples, classification loss may be given by the softmax loss over multiple classes confidences (c), as shown below. The weight term α is set to 1 by cross validation. The first term of the equation is the classification loss over the positive bounding boxes (e.g., bounding boxes having a large intersection over union (e.g., an intersection over union (IoU) larger than a threshold). The latter term is the classification loss over the negative bounding boxes (e.g., annotated bounding boxes with a maximum IoU below a different threshold). In the below equation, i is the index of the bounding box and p is the class label (where the background class has a label of 0).

$$L_{conf}(x, c) = -\sum_{i \in Pos}^{N} x_{ij}^p \log(\hat{c}_i^p) - \sum_{i \in Neg}^{N} \log(\hat{c}_i^o) \text{ where } \hat{c}_i^p = \frac{\exp(c_i^p)}{\sum_p \exp(c_i^p)}$$

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize the cost. For example, the machine learning model may use a gradient descent algorithm to incrementally adjust the weights to cause the most rapid decrease to the output of the loss function.

Figure 5:
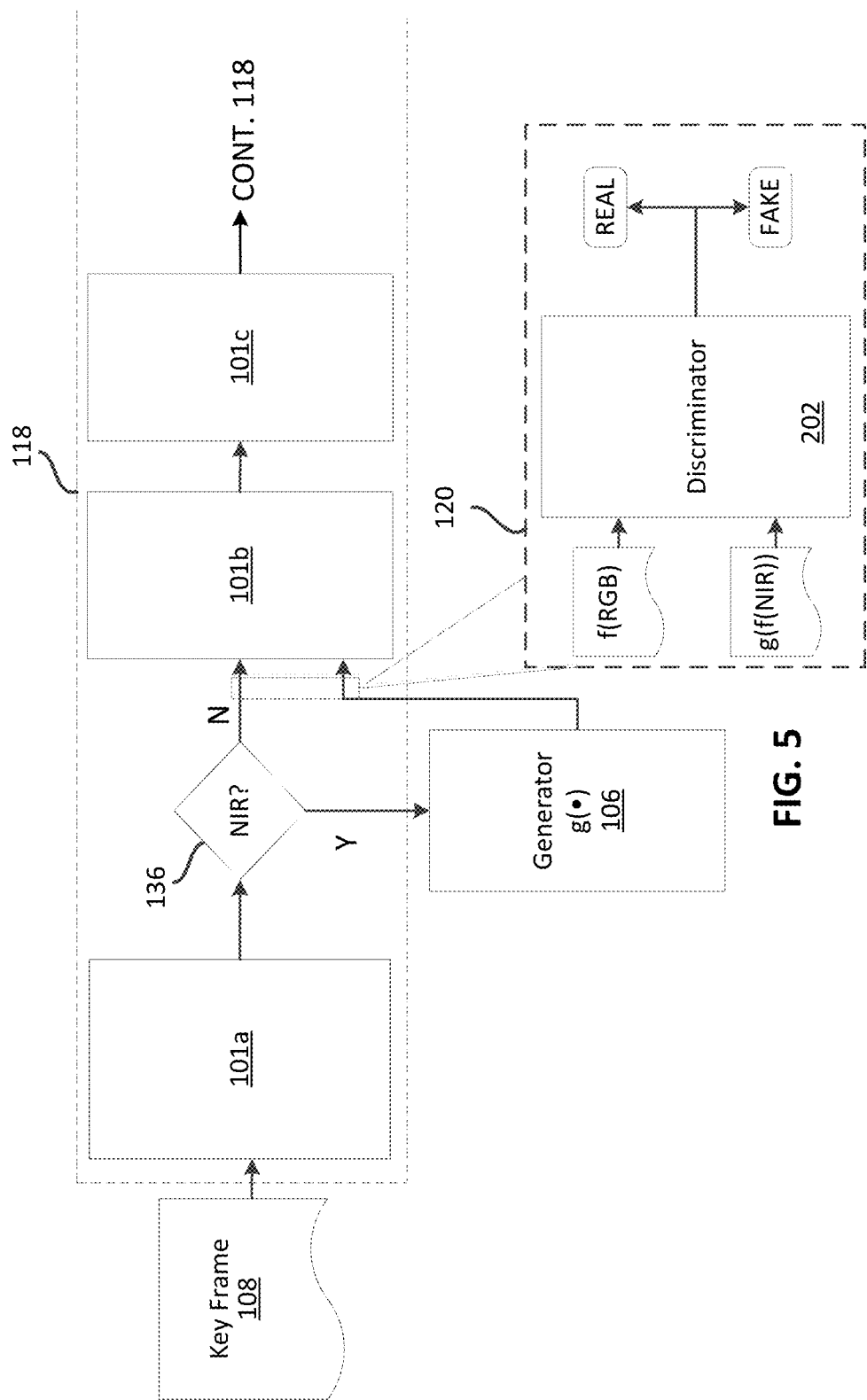
FIG. 5 is a block diagram depicting a fourth training stage effective to jointly train a detector, a generator, and a discriminator, in accordance with various aspects of the present disclosure.

FIG. 5 generally depicts fixing discriminator 202 and training generator 106 and detector 118 jointly using detection and generative losses with the fixed discriminator 202. In FIG. 5, generator 106 and detector 118 are trained jointly with respect to a fixed discriminator 202 using detection losses and generative losses. Discriminator 202 may be described as "fixed" as weights and/or biases of the discriminator 202 may be maintained during the training process of FIG. 5. During the training stage depicted in FIG. 5, the discriminator 202 may determine whether or not RGB feature data are real or fake. If the discriminator 202 correctly identifies that a synthetic RGB feature is fake (as opposed to synthetic), this information may be fed back to the generator 106 as generative loss. Generator 106 may adjust weights accordingly to improve the ability of generator 106 to generate synthetic RGB feature vector data that appears to discriminator 202 to be real RGB feature vector data. Similarly, real and synthetic RGB feature vector data may be provided to detector 118 to minimize detection losses of detector 118 during the training stage depicted in FIG. 5.

After the generator 106 and detector 118 are trained jointly with respect to a fixed discriminator 202, the generator 106, detector 118, and discriminator 202 may be jointly trained. Back propagation may again be used so that detection loss may be used to update parameters (e.g., weights and/or biases) of the detector 118, generative losses may be back propagated so that generative loss may be used to update parameters of the generator 106, and discriminative losses (e.g., incorrect determination of real or fake RGB feature vector) may be back propagated to the discriminator to update parameters of the discriminator.

Additionally, feature data may be extracted at different layers of the detector 118. Feature data extracted at various different levels may be used to jointly train the system 100 in accordance with the techniques described above in reference to FIGS. 2-5. For example, the processes described above in reference to FIGS. 2-5 may be repeated in different iterations for feature data extracted at different layers of the detector 118.

Figure 6:
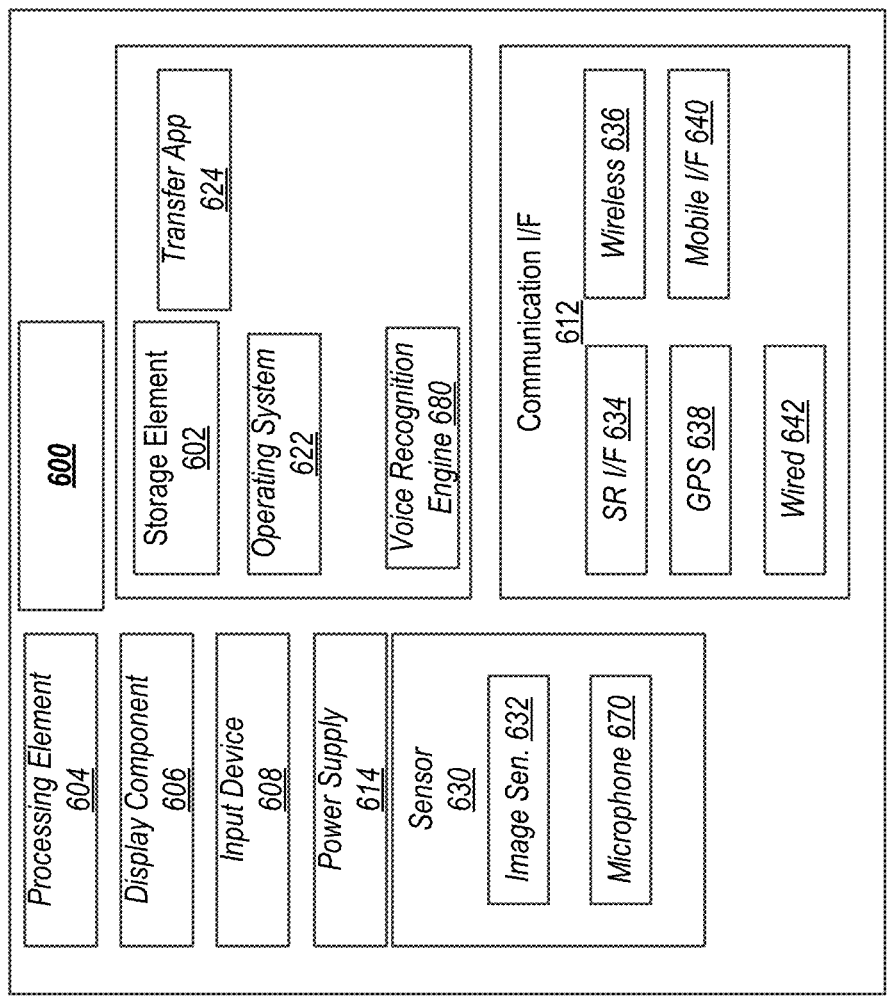
FIG. 6 depicts an example architecture of a computing device that may be used in accordance with various aspects of the present disclosure.

FIG. 6 is a block diagram showing an example architecture 600 of a computing device, such as the camera devices, processors, mobile devices, and other computing devices described herein. It will be appreciated that not all user devices will include all of the components of the architecture 600 and some user devices may include additional components not shown in the architecture 600. The architecture 600 may include one or more processing elements 604 for executing instructions and retrieving data stored in a non-transitory computer-readable storage element 602. The processing element 604 may comprise at least one processor. Any suitable processor or processors may be used. For example, the processing element 604 may comprise one or more digital signal processors (DSPs) and/or image signal processors (ISPs). In some examples, the processing element 604 may be effective to perform one or more functions of detector 118, GAN 120, and/or generator 106, as described above. The storage element 602 can include one or more different types of non-transitory, computer-readable memory, data storage, or computer-readable storage media devoted to different purposes within the architecture 600. For example, the storage element 602 may comprise flash memory, random-access memory, disk-based storage, etc. Different portions of the storage element 602, for example, may be used for program instructions for execution by the processing element 604, storage of images or other digital works, and/or a removable storage for transferring data to other devices, etc.

The storage element 602 may also store software for execution by the processing element 604. An operating system 622 may provide the user with an interface for operating the user device and may facilitate communications and commands between applications executing on the architecture 600 and various hardware thereof. A transfer application 624 may be configured to receive images and/or video from another device (e.g., a mobile device, image capture device, and/or display device) or from an image sensor 632 included in the architecture 600 (e.g., camera 130). In some examples, the transfer application 624 may also be configured to upload the received images to another device that may perform processing as described herein (e.g., a mobile device and/or another computing device).

When implemented in some user devices, the architecture 600 may also comprise a display component 606. The display component 606 may comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 600 may also include one or more input devices 608 operable to receive inputs from a user. The input devices 608 can include, for example, a push button, touch pad, touch screen, wheel, joystick, keyboard, mouse, trackball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone 670 for capturing sounds, such as voice commands. Voice recognition engine 680 may interpret audio signals of sound captured by microphone 670. In some examples, voice recognition engine 680 may listen for a "wake word" to be received by microphone 670. Upon receipt of the wake word, voice recognition engine 680 may stream audio to a voice recognition server for analysis. In various examples, voice recognition engine 680 may stream audio to external computing devices via communication interface 612.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

The communication interface 612 may comprise one or more wired or wireless components operable to communicate with one or more other user devices. For example, the communication interface 612 may comprise a wireless communication module 636 configured to communicate on a network, such as the network 104, according to any suitable wireless protocol, such as IEEE 802.11 or another suitable wireless local area network (WLAN) protocol. A short range interface 634 may be configured to communicate using one or more short range wireless protocols such as, for example, near field communications (NFC), Bluetooth, Bluetooth LE, etc. A mobile interface 640 may be configured to communicate utilizing a cellular or other mobile protocol. A Global Positioning System (GPS) interface 638 may be in communication with one or more earth-orbiting satellites or other suitable position-determining systems to identify a position of the architecture 600. A wired communication module 642 may be configured to communicate according to the USB protocol or any other suitable protocol. In various examples where architecture 600 represents camera 130 (shown in FIG. 1), mobile interface 640 may allow camera 130 to communicate with one or more other computing devices such as computing device(s) 102 shown in FIG. 1.

The architecture 600 may also include one or more sensors 630 such as, for example, one or more position sensors, image sensors, and/or motion sensors. An image sensor 632 is shown in FIG. 6. Some examples of the architecture 600 may include multiple image sensors 632. For example, a panoramic camera system may comprise multiple image sensors 632 resulting in multiple images and/or video frames that may be stitched and may be blended to form a seamless panoramic output. An example of an image sensor 632 may be camera 130 shown and described in FIG. 1. As described, camera 130 may be configured to capture color information, IR image data, image geometry information, and/or ambient light information.

Motion sensors may include any sensors that sense motion of the architecture including, for example, gyro sensors and accelerometers. Motion sensors, in some examples, may be used to determine an orientation, such as a pitch angle and/or a roll angle, of camera 130 (shown in FIG. 1). A gyro sensor may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. In some examples, an accelerometer (not shown in FIG. 6) may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 638 may be utilized as a motion sensor. For example, changes in the position of the architecture 600, as determined by the GPS interface 638, may indicate the motion of the GPS interface 638. As described, in some examples, image sensor 632 may be effective to detect infrared light. In at least some examples, architecture 600 may include an infrared light source to illuminate the surrounding environment.

FIG. 7 is an example diagram depicting a cycle GAN 700 used to train a generator to transform image data, in accordance with various aspects of the present disclosure. The diagram in FIG. 7 depicts a cycle GAN 700 in which RGB image data 701 (e.g., a frame of RGB image data) is transformed by a first generator 702 to generate synthetic frame of NIR image data 703 and is transformed by a second generator 705 to generate synthetic RGB image data 706 from the synthetic NIR image data 703. Discriminator 704 discriminates between real infrared image data (e.g., frames of infrared images captured by an infrared image sensor) and the synthetic frames of NIR image data 703 provided by generator 702. Discriminator 704 provides a binary decision as to whether an input image is real or fake.

In general, the generators described herein (e.g., generators 702, 705) may comprise an encoder and a decoder. The encoder may extract latent feature data from input image data by applying consecutive convolution operations, optionally down-sampling the feature data with a convolution stride larger than one. The decoder may construct the output, transformed image from the latent feature data using a series of deconvolution (transpose convolution) layers. The deconvolution may include an up-sampling rate/deconvolution stride in order to recover a target output resolution. In some further examples, the generators described herein may comprise a residual connection between corresponding convolution layers in the encoder and a residual connection between deconvolution layers in the decoder.

Discriminators 704 and 707 may be objective functions implemented as classifiers. In various examples, discriminators 704 and 707 may be implemented as neural networks with multiple layers. A reconstruction loss may be determined representing the difference between the original real RGB image data 701 and the synthetic RGB image data 706 generated by generator 705. Reconstruction loss may represent differences between RGB image data 701 and synthetic RGB image data 706. Generators 702 and 705 may be trained to minimize reconstruction loss. Discriminator 707 may provide a binary decision as to whether the RGB image data 706 is real (e.g., non-synthetic image data) or fake (e.g., synthetic image data). Back propagation is used to train discriminators 704, 707 and generators 702, 705, until an acceptable level of performance is reached. For example, data may be provided to generator 702 indicating whether or not discriminator 704 determined that synthetic NIR image data 703 was synthetic. Weights of generator 702 may be updated based on the back propagation signal to reduce the likelihood that discriminator 704 is able to distinguish synthetic image data from real image data. Similarly, data may be provided to discriminator 704 indicating whether or not the binary determination made by discriminator 704 (as to whether NIR image data provided to discriminator 704 was real or fake) was correct or not. Weights of discriminator 704 may be updated to increase the accuracy of discriminator 704. Similar loss data may be back propagated to generator 705 and discriminator 707 during training.

In various examples, cycle GAN 700 may be used to train generator 702 to transform real RGB image data (e.g., frames of RGB image data) to synthetic, but realistic, NIR image data. Accordingly, the generator may be used to generate synthetic annotated NIR image data from real annotated RGB image data. Such synthetic annotated NIR image data may be used to train an object detection model in the NIR domain. For example, an SSD may be trained to detect objects in the NIR domain using the synthetic annotated NIR image data generated by generator 702, after generator 702 is itself trained using the cycle GAN 700 to produce realistic synthetic NIR image data from real RGB image data. Synthetic frames of annotated NIR image data generated from real frames of annotated RGB image data may include representations of the bounding boxes and classifications of the real annotated RGB image data. Additionally, during inference, an SSD trained to perform object detection in the NIR domain may receive input image data in the RGB domain. Generator 702, as trained using cycle GAN 700, may transform the RGB image data into synthetic NIR image data for classification during inference. In some further examples, generators trained in accordance with the techniques described above in FIG. 7 (e.g., generator 702) may be used to transform annotated RGB image data into annotated NIR image data. In turn, annotated NIR image data may be used during training of the feature-level system 100 depicted in FIG. 1.

Figure 8:
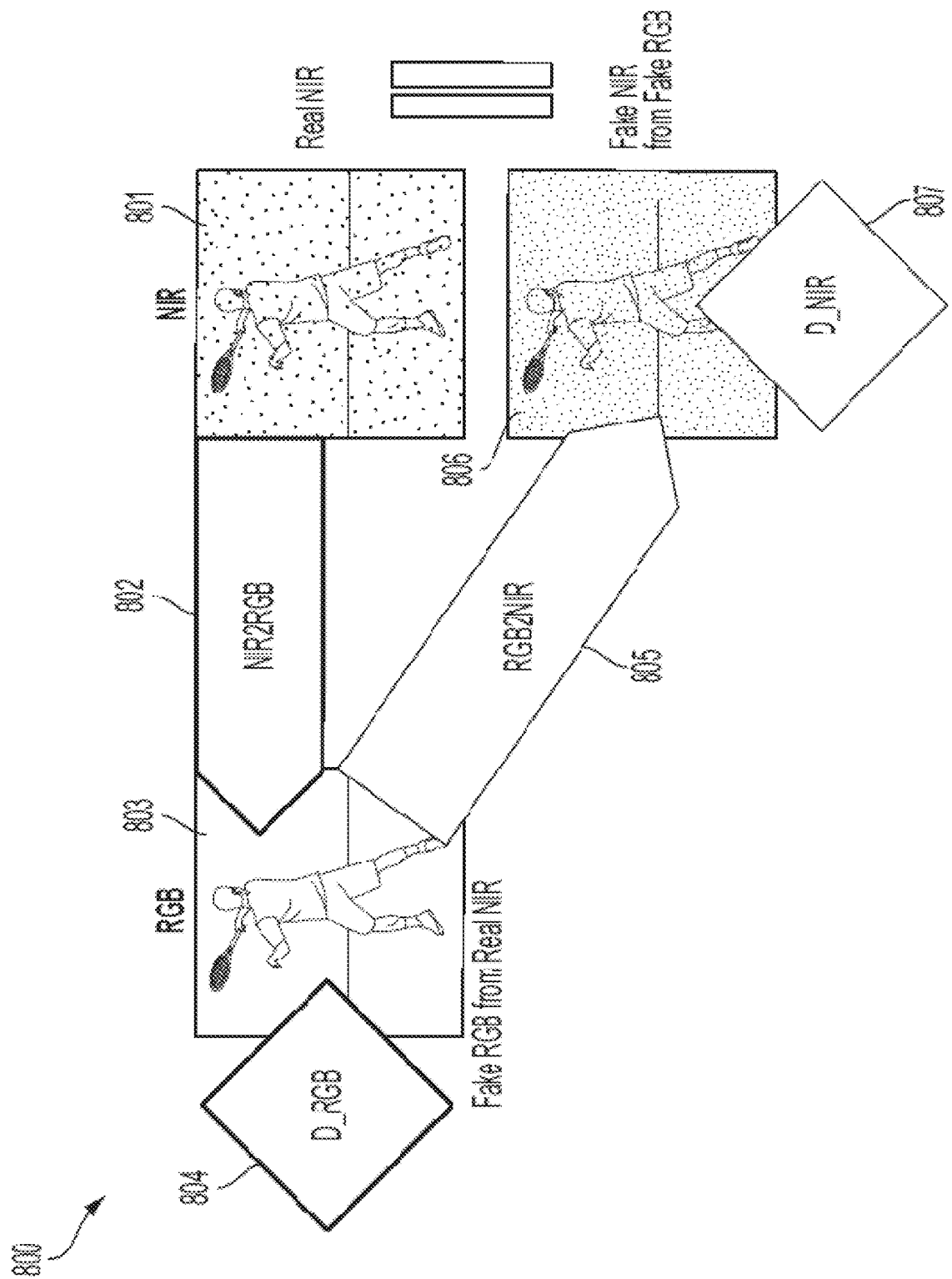
FIG. 8 is an example diagram depicting another cycle generative adversarial network used to train a generator to transform image data, in accordance with various aspects of the present disclosure.

FIG. 8 is an example diagram depicting a cycle GAN 800 used to train a generator to transform image data, in accordance with various aspects of the present disclosure. The diagram of FIG. 8 depicts a cycle GAN 800 in which real NIR image data 801 (e.g., a frame of NIR image data captured by an IR sensor) is transformed by a first generator 802 to generate synthetic RGB image data 803 and is transformed by a second generator 805 to generate synthetic NIR image data 806 from the synthetic RGB image data 803. Discriminator 804 discriminates between real RGB image data (e.g., frames of unlabeled infrared images) and the synthetic RGB image data 803 provided by generator 802. Discriminator 804 provides a binary decision as to whether an input image is real or fake.

Discriminators 804 and 807 may be objective functions implemented as classifiers. In various examples, discriminators 804 and 807 may be implemented as neural networks with multiple layers. A reconstruction loss may be determined representing the difference between the original real NIR image data 801 and the synthetic NIR image data 806 generated by generator 805. Reconstruction loss may represent differences between NIR image data 801 and synthetic NIR image data 806. Generators 802 and 805 may be trained to minimize reconstruction loss. Discriminator 807 may provide a binary decision as to whether the input NIR image data is real or fake. Back propagation is used to train discriminators 804, 807 and generators 802, 805, until an acceptable level of performance is reached. For example, data may be provided to generator 802 indicating whether or not discriminator 804 determined that synthetic RGB image data 803 was fake. Similarly, data may be provided to discriminator 804 indicating whether or not the binary determination made by discriminator 804 (as to whether RGB image data provided to discriminator 804 was real or fake) was correct or not. Similar loss data may be back propagated to generator 805 and discriminator 807 during training.

In various examples, cycle GAN 800 may be used to train generator 802 to transform real NIR image data (e.g., frames of NIR image data) to synthetic, but realistic, RGB image data. Accordingly, a detector (e.g., an SSD) trained using a dataset of annotated RGB images to detect objects in the RGB domain may receive NIR image data during runtime (e.g., during inference), transform the NIR image data to synthetic RGB image data using generator 802 and detect objects in the synthetic RGB image data.

Figure 9:
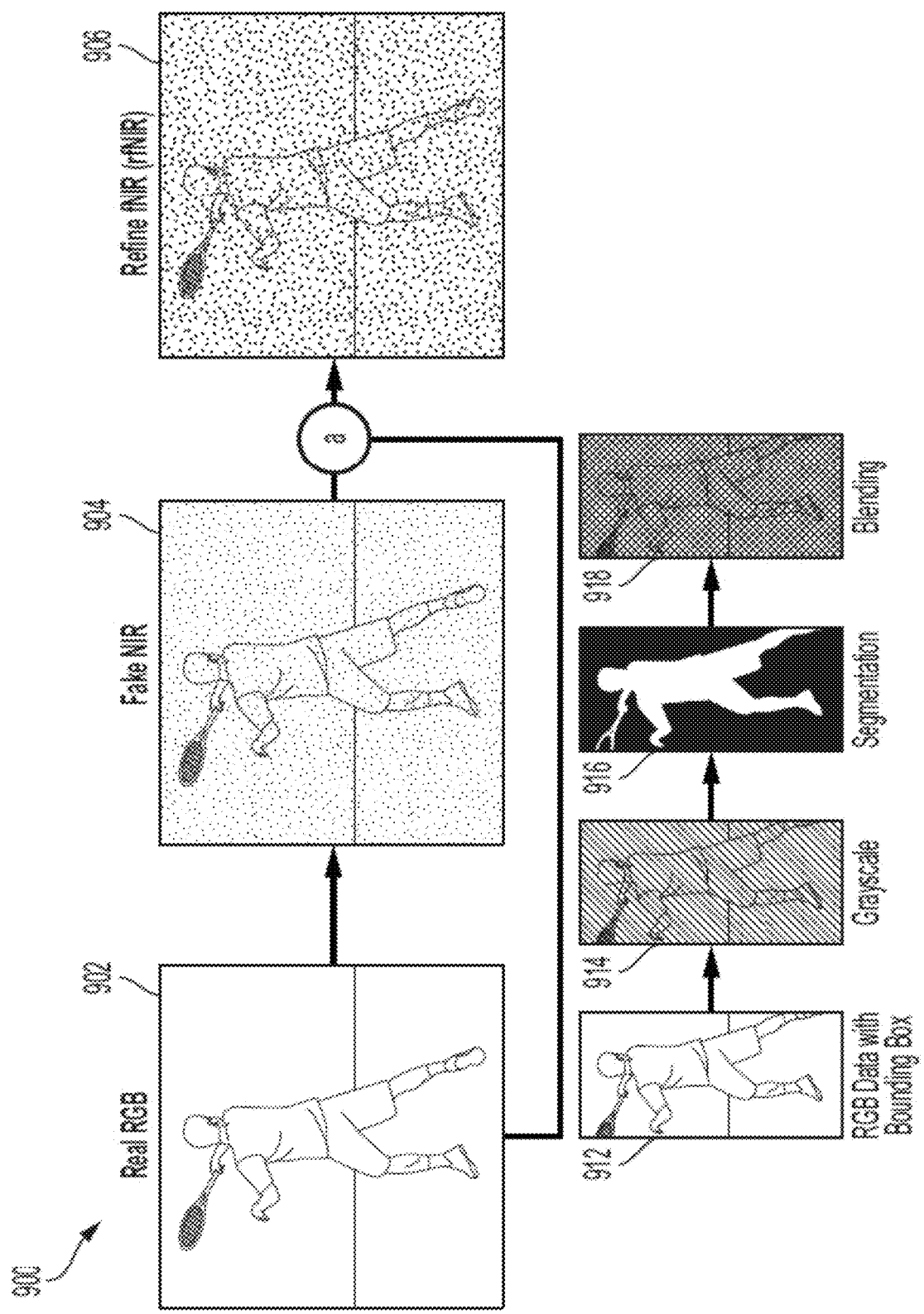
FIG. 9 depicts a process for refining transformed image data, in accordance with various aspects of the present disclosure.

FIG. 9 depicts a process 900 for refining transformed image data, in accordance with various aspects of the present disclosure. Those aspects of FIG. 9 that have been described above in reference to FIGS. 1-8 may not be described again herein for purposes of clarity and brevity. In various examples, a synthetic NIR image 904 may be generated from a real RGB image 902, using for example, a generator trained in accordance with the techniques described above in reference to FIGS. 7 and 8. In some cases, the foreground image data of the synthetic NIR image 904 may appear unrealistic. For example, the foreground image data of the synthetic NIR image 904 may appear too bright relative to a dark background of a real image captured in the NIR domain. Accordingly, the annotated RGB data 912 may first be transformed to grayscale image data 914 (e.g., a grayscale representation of the image data in the luminance channel). Thereafter, segmentation of the detected object (e.g., the standing human depicted in FIG. 9) may be used to segment the annotated object so that the grayscale image data is confined as closely as possible to the contours of the detected object. Performing object segmentation may include labeling pixels of an object of interest as "foreground pixels" and labeling other background pixels as "background". In various examples, metadata and/or an image segmentation mask may be used to label pixels as foreground pixels and background pixels.

The segmented image 916 may be blended with the synthetic NIR image 904 using a randomly-selected coefficient between 0 and 1, where 0 represents a completely dark luminance and 1 represents an opaque white color. Various alpha-blending techniques known to those of skill in the art may be used to blend the grayscale segmented image 916 with the synthetic NIR image 904 at blending action 918. The refined frame of NIR image data 906 may be generated as a result of blending action 918. The refined NIR image 906 may include foreground data (e.g., the standing human depicted in FIG. 9) that is more realistic in terms of brightness relative to synthetic NIR image 904. Accordingly, the refined NIR image 906 may be used to train an object detector in the NIR domain. Additionally, the refined NIR image 906 may be an improved quantum of training data relative to synthetic NIR image 904. For example, the human of synthetic NIR image 904 may be too bright for a realistic NIR scene. Accordingly, if an NIR-based detector is trained with a dataset comprising many such synthetic images, where the foreground data appears excessively bright relative to real NIR data, the resulting NIR-based detector may not perform as well during inference as a detector trained using refined NIR images processed according to the techniques described above.

In various examples, a determination may be made that foreground image data is too bright, and may therefore benefit from the refinement techniques described in FIG. 9, by determining the mean pixel value (e.g., average luma value) of pixels within the foreground image data or bounding box. If pixel values of the background image data are more than two to three standard deviations from the mean value of the background region, the process in FIG. 9 may be used to refine the foreground image data using blending. In another example, the average pixel value of the foreground image data may be compared to a threshold intensity value to determine whether the refinement techniques of FIG. 9 are appropriate.

Additionally, in some examples, a global refinement of brightness (e.g., luminance) may be performed during inference of a trained model by converting the image to grayscale and blending the alpha-weighted grayscale image with the original image. In various examples, such techniques may improve the performance of a detector during inference.

Figure 10:
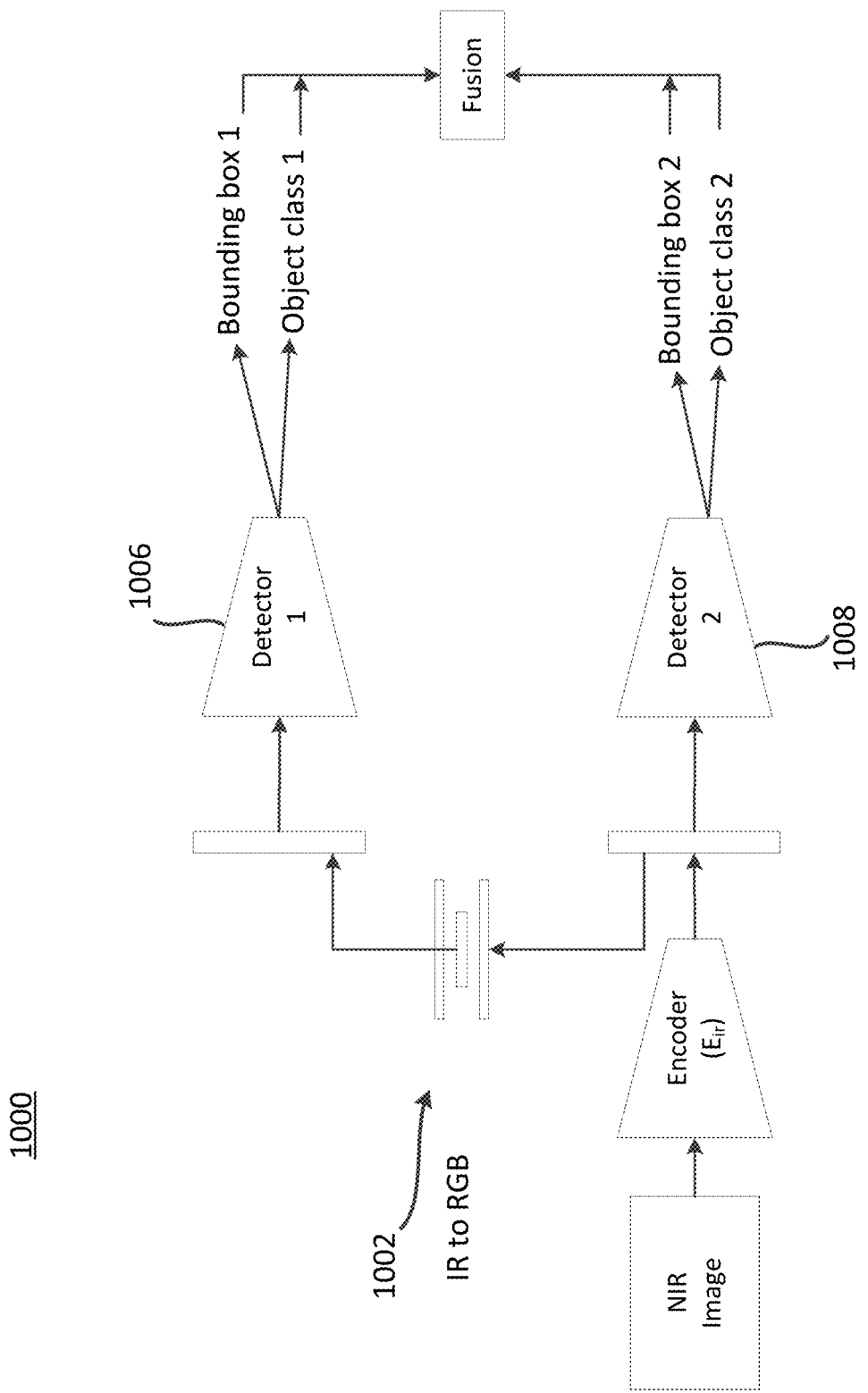
FIG. 10 depicts a fused network using multiple detectors and multiple generators that may detect and/or classify objects, in accordance with various aspects of the present disclosure.

FIG. 10 depicts a fused network 1000 using multiple detectors and multiple generators that may detect and/or classify objects, in accordance with various aspects of the present disclosure. Those aspects of FIG. 10 that have been described above in reference to FIGS. 1-9 may not be described again herein for purposes of clarity and brevity. In FIG. 10, two detectors (e.g., SSDs) 1006 and 1008 are shown. In an example, detector 1006 may be trained to detect objects in the RGB domain, in accordance with the various techniques described above. Similarly, detector 1008 may be trained to detect objects in the NIR domain, in accordance with the various techniques described above. As previously discussed, the RGB domain and NIR domain are used for illustrative purposes only, and any other two domains may be used in accordance with the present disclosure.

In the example depicted in FIG. 10, an NIR image may be received. The NIR image may be encoded to extract feature data in the NIR domain, and the feature data may be sent to detector 1008 to generate first bounding boxes and/or respective first classifications. In parallel, the NIR feature data may be passed to generator 1002. Generator 1002 may be trained in accordance with the various techniques described above (e.g., using one or more GANs) to transform the NIR feature data to synthetic RGB feature data. The synthetic RGB feature data may be passed to detector 1006 to generate second bounding boxes and/or respective second classifications. The results from detector 1006 and detector 1008 may be fused using non-maximal suppression to find the bounding boxes and/or classifications from detectors 1006, 1008 with the highest confidence scores that are more likely to represent a more accurate location of the object-of-interest. Although, in the preceding example, NIR and RGB domains are provided by way of example, any image domains (e.g., thermal IR, UV, visible, etc.) may instead be used in accordance with the techniques described herein.

Figure 11:
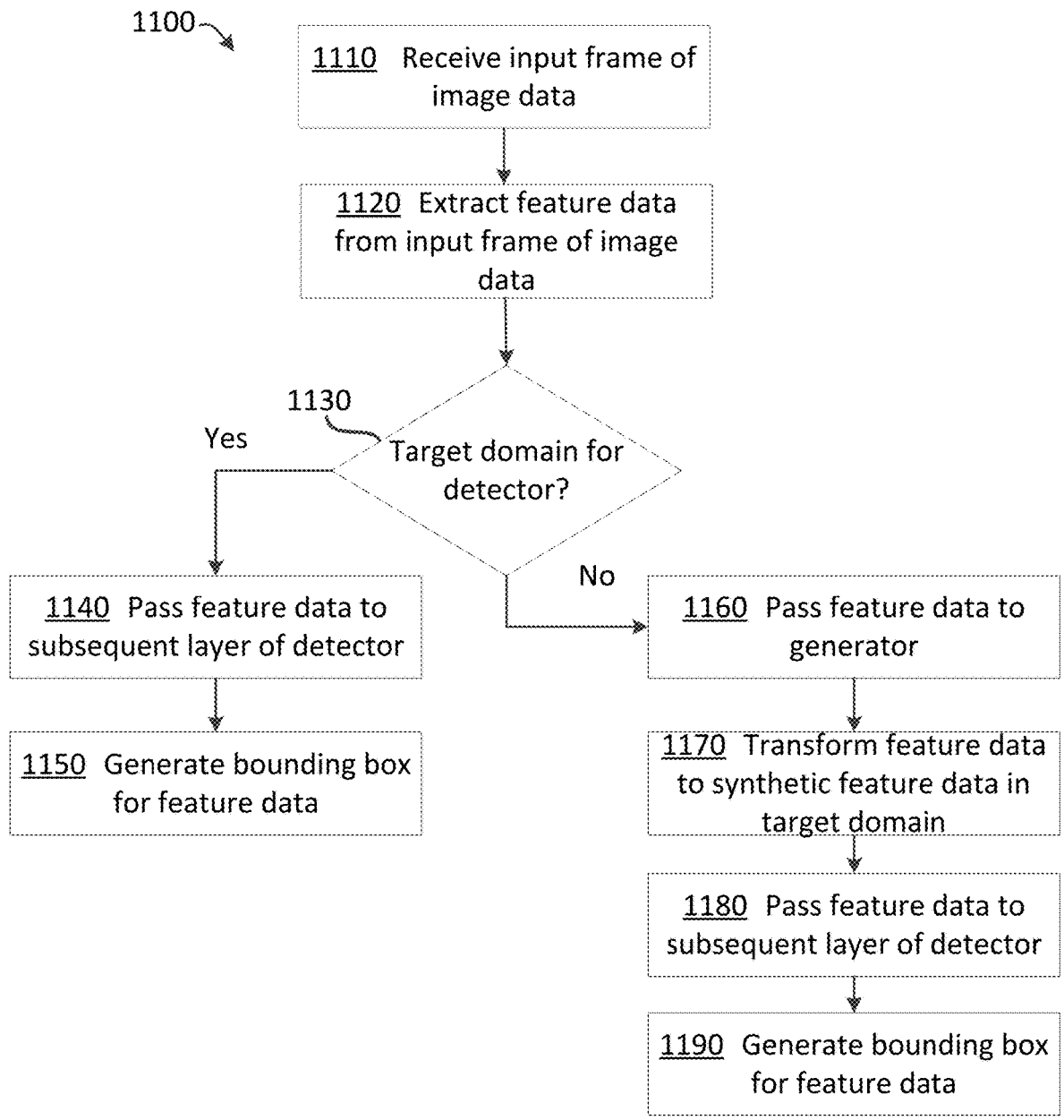
FIG. 11 depicts a flow chart showing an example process for object detection in image data.

FIG. 11 depicts a flow chart showing an example process 1100 for object detection in image data. The process 1100 of FIG. 11 may be executed by computing device(s) 102 and/or by a combination of computing device(s) 102 and camera 130. The actions of process 1100 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 1100 may be described above with reference to elements of FIGS. 1-10.

Processing may begin at action 1110, "Receive input frame of image data". At action 1110, the detector 118 may receive an input frame of image data. In various examples, the input frame of image data may comprise a plurality of pixel addresses arranged in a two-dimensional grid. Each pixel address may be associated with a pixel value representing a color, brightness, and/or other parameter of the pixel address. The input frame of image data may be, for example, an NIR frame of image data.

Processing may continue from action 1110 to action 1120, "Extract feature data from input frame of image data". At action 1120, the detector 118 may extract a feature vector or feature map from the input frame of image data. For example, a layer of the detector 118 may generate a feature vector as an output of the layer. The feature vector may represent some portion of the NIR image data.

At action 1130, a determination may be made whether or not the extracted feature data is in a target domain for the detector (e.g., RGB) or whether the extracted feature data is in a different domain (e.g., NIR). In various examples, the domain or modality of the input image data is known. Accordingly, the domain of the extracted feature data (prior to transformation) is the same as the input image data. As previously discussed, although NIR and RGB domains are principally discussed herein, any two domains may be used in accordance with the present disclosure.

If the feature data is in the target domain (e.g., the RGB domain), processing may proceed from action 1130 to action 1140, "Pass feature data to subsequent layer of detector". At action 1140, the feature data (e.g., RGB feature data) may be passed to the next layer of the detector for further processing (FIG. 1).

Processing may continue from action 1140 to action 1150, "Generate bounding box for feature data." At action 1150, the detector may output a bounding box corresponding to the particular feature data extracted at action 1120. The bounding box may identify a grouping of contiguous pixels (e.g., by identifying contiguous pixel addresses) within the frame of image data received at action 1110. In various examples, the detector may also classify an object within the bounding box. For example, if the detector is trained to detect dogs, the detector may output classification data indicating a confidence value that an object depicted within the bounding box is a dog.

If, at action 1130, the feature data is determined not to be in the target domain for the detector, processing may proceed from action 1130 to action 1160, "Pass feature data to generator". In various examples, the feature data (e.g., NIR feature data) may be sent to a generator component that may be trained using a GAN, as described above.

Processing may continue from action 1160 to action 1170, "Transform feature data to synthetic feature data in target domain." As described above in reference to FIG. 1, the generator 106 may transform the feature data from an non-target domain (e.g., NIR) into a target domain (e.g., RGB).

Processing may proceed from action 1170 to action 1180, "Pass feature data to subsequent layer of detector". At action 1180, the generator 106 may pass the synthetic feature data (e.g., a synthetic RGB feature vector) to the next layer of the detector (e.g., an SSD) for further processing. Processing may proceed from action 1180 to action 1190, "Generate bounding box for feature data". At action 1190, the detector may output a bounding box corresponding to the particular feature data extracted at action 1120. The bounding box may identify a grouping of contiguous pixel addresses within the frame of image data received at action 1110. In various examples, the detector may also classify an object within the bounding box. For example, if the detector is trained to detect dogs, the detector may output classification data indicating a confidence value that an object depicted within the bounding box is a dog.

Among other potential benefits, various embodiments of the present disclosure may be effective to generate synthetic training data that may be used to effectively train machine learning models, when annotated training data in the domain of interest is otherwise unavailable, is in short supply, or is burdensome and/or time consuming to generate. Further, in various embodiments, extracting features and using feature data to train machine learning models and/or to perform inference may serve as a type of encryption, as the original image data may not be perceivable from the feature data. Additionally, transformation of feature data from one domain to another (e.g., RGB to NIR) is computationally less intensive relative to transformation of image data between the two domains. For example, RGB image data includes three channels, whereas NIR image data includes a single channel. Transformation between these two domains requires a transformation from 3 dimensions to a single dimension. Conversely, transformation of a feature vector in one domain to another is a one-to-one transformation which may save computational resources. Additionally, using the techniques described herein traditional RGB-based image detectors (e.g., those trained in the RGB domain) may be used to detect objects when the input image data is in another domain (e.g., infrared) using the GAN-trained generators described herein.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of object detection, comprising:
    receiving, by a single shot detector (SSD) executing on at least one computing device, a first frame of RGB image data, the SSD configured to detect humans represented in image data;
    generating, by a first layer of the SSD, first feature data in an RGB domain, the first feature data representing the first frame of RGB image data;
    determining, by the SSD, a first plurality of contiguous pixels representing a first human from the first feature data;
    generating, by an output layer of the SSD, a first bounding box defining the first plurality of contiguous pixels in the first frame of RGB image data;
    receiving, by the SSD, a first frame of near infrared (NIR) image data;
    generating, by the first layer of the SSD, second feature data in an NIR domain, the second feature data representing the first frame of NIR image data;
    sending, by the SSD, the second feature data to a generator neural network configured to transform NIR feature data into RGB feature data;
    transforming, by the generator neural network, the second feature data to a third feature data, wherein the third feature data represents first synthetic RGB feature data in the RGB domain;
    determining, by the SSD, a second plurality of contiguous pixels representing a second human from the third feature data; and
    generating, by the output layer of the SSD, a second bounding box defining the second plurality of contiguous pixels representing the second human in the first frame of NIR image data.

2. The method of claim 1, further comprising:
    receiving, by the generator neural network from the SSD, fourth feature data in the NIR domain;
    transforming, by the generator neural network, the fourth feature data to fifth feature data, wherein the fifth feature data represents second synthetic RGB feature data in the RGB domain;
    sending the second synthetic RGB feature data to a discriminator;
    determining, by the discriminator, that the second synthetic RGB feature data represents synthetic feature data generated by the generator neural network as opposed to feature data extracted from image data captured by an image sensor;
    sending a back-propagation signal to the generator neural network indicating that the discriminator determined that the second synthetic RGB feature data represents synthetic feature data; and updating a weight associated with activation of a node of the generator neural network based at least in part on the back-propagation signal.

3. The method of claim 1, further comprising:
determining, a localization loss and a classification loss, the localization loss representing an offset between a pixel address of the second bounding box and a corresponding pixel address of an annotated bounding box of the first frame of NIR image data, the classification loss representing a likelihood of a predicted class of the second bounding box corresponding to a class of the annotated bounding box, wherein the annotated bounding box defines a third plurality of pixels manually labeled as representing the second human;
updating a weight associated with activation of a node of the generator neural network to minimize the localization loss and the classification loss; and
updating a weight associated with activation of a node of the SSD to minimize the localization loss.

4. A computer-implemented method of object detection, comprising:
receiving, by a detector, a first frame of image data, the first frame of image data being in a first domain;
generating, by the detector, first feature data comprising a representation of the first frame of image data in the first domain;
determining, by the detector, a first plurality pixels representing a first object based at least in part on the first feature data;
generating, by the detector, a first bounding box defining a location of the first plurality of pixels in the first frame of image data;
receiving, by the detector, a second frame of image data, the second frame of image data being in a second domain different from the first domain;
generating, by the detector, second feature data comprising a representation of the second frame of image data in the second domain;
sending the second feature data to a generator configured to transform feature representations of image data from the second domain to the first domain;
transforming the second feature data from the second domain into third feature data in the first domain;
determining, by the detector, a second plurality of pixels representing a second object from the third feature data; and
generating, by the detector, a second bounding box defining a location of the second plurality of pixels in the second frame of image data.

5. The method of claim 4, further comprising:
receiving, by a generative adversarial network (GAN) comprising the generator and a discriminator, fourth feature data associated with the first domain;
determining, by the discriminator, that the fourth feature data corresponds to a data distribution associated with the first domain; and
updating at least one parameter of the discriminator based at least in part on the determination that the fourth feature data corresponds to the data distribution.

6. The method of claim 4, further comprising:
receiving, by a generative adversarial network (GAN), fourth feature data in the second domain;
transforming, by the GAN, the fourth feature data into fifth feature data in the first domain, wherein the fifth feature data comprises a synthetic representation of the fourth feature data in the first domain;
determining, by a discriminator of the GAN, that the fifth feature data comprises synthetic feature data; and
updating at least one parameter of a generator of the GAN based at least in part on the determination by the discriminator that the fifth feature data comprises synthetic feature data.

7. The method of claim 4, the method further comprising:
sending the second feature data from an output of a first layer of the detector to a multi-layer neural network, wherein the transforming the second feature data from the second domain into the third feature data in the first domain is performed by the multi-layer neural network;
sending, by the multi-layer neural network, the third feature data to a second layer of the detector, the second layer following the first layer; and
processing, by the detector the third feature data to generate the second bounding box.

8. The method of claim 4, further comprising:
training the generator using first training data in a generative adversarial network, wherein the first training data comprises unannotated RGB feature data and unannotated infrared feature data;
coupling the generator to a first layer of the detector, wherein the second feature data is generated by the first layer of the detector; and
coupling the generator to a second layer of the detector, wherein the third feature data is sent to the second layer of the detector from the generator.

9. The method of claim 8, further comprising:
sending, to the detector, an annotated frame of infrared image data;
generating, by the detector, infrared feature data from the annotated frame of infrared image data;
transforming, by the generator, the infrared feature data into synthetic RGB feature data; and
updating at least one parameter of the detector without updating a parameter of the generator.

10. The method of claim 9, further comprising:
sending, to the detector, a second annotated frame of infrared image data;
generating, by the detector, second infrared feature data from the second annotated frame of infrared image data;
transforming, by the generator, the second infrared feature data into second synthetic RGB feature data;
determining, by the detector, a third bounding box surrounding an object-of-interest in the second synthetic RGB feature data;
determining, by the detector, a detection loss by comparing the third bounding box to a fourth bounding box identified by an annotation of the second annotated frame of infrared image data, wherein the detection loss comprises a classification loss and a localization loss;
updating the at least one parameter of the detector based at least in part on the detection loss; and
updating at least one parameter of the generator based at least in part on the detection loss.

11. The method of claim 4, wherein the transforming the second feature data from the second domain into third feature data in the first domain is performed by the generator trained using a generative adversarial network, the method further comprising:
sending, to the detector, an annotated frame of infrared image data;
generating, by the detector, infrared feature data from the annotated frame of infrared image data;

transforming, by the generator, the infrared feature data into synthetic RGB feature data;

generating, by a discriminator of the generative adversarial network, a binary decision indicating that the synthetic RGB feature data is synthetic;

updating a first parameter of the generator based at least in part on the binary decision; and updating a first parameter of the detector based at least in part on the binary decision.

12. The method of claim 11, further comprising:

determining, by the detector, a third bounding box surrounding an object-of-interest in the synthetic RGB feature data;

determining, by the detector, a detection loss by comparing the third bounding box to a fourth bounding box identified by an annotation of the annotated frame of infrared image data;

updating the first parameter of the generator to minimize the detection loss; and updating the first parameter of the detector to minimize the detection loss.

13. A system comprising:

at least one processor; and a non-transitory, computer-readable memory storing instructions that when executed by the at least one processor program the at least one processor to perform a method comprising:

receiving, by a detector, a first frame of image data, the first frame of image data being in a first domain;

generating, by the detector, first feature data comprising a representation of the first frame of image data in the first domain;

determining, by the detector, a first plurality pixels representing a first object based at least in part on the first feature data;

generating, by the detector, a first bounding box defining a location of the first plurality of pixels in the first frame of image data;

receiving, by the detector, a second frame of image data, the second frame of image data being in a second domain different from the first domain;

generating, by the detector, second feature data comprising a representation of the second frame of image data in the second domain;

sending the second feature data to a generator configured to transform feature representations of image data from the second domain to the first domain;

transforming the second feature data from the second domain into third feature data in the first domain;

determining, by the detector, a second plurality of pixels representing a second object from the third feature data; and generating, by the detector, a second bounding box defining a location of the second plurality of pixels in the second frame of image data.

14. The system of claim 13, wherein the instructions, when executed by the at least one processor are effective to program the at least one processor to perform the method further comprising:

receiving, by a generative adversarial network (GAN) comprising the generator and a discriminator, fourth feature data associated with the first domain;

determining, by the discriminator, that the fourth feature data corresponds to a data distribution associated with the first domain; and updating at least one parameter of the discriminator based at least in part on the determination that the fourth feature data corresponds to the data distribution.

15. The system of claim 13, wherein the instructions, when executed by the at least one processor are effective to program the at least one processor to perform the method further comprising:

receiving, by a generative adversarial network (GAN), fourth feature data in the second domain;

transforming, by the GAN, the fourth feature data into fifth feature data in the first domain, wherein the fifth feature data comprises a synthetic representation of the fourth feature data in the first domain;

determining, by a discriminator of the GAN, that the fifth feature data comprises synthetic feature data; and updating at least one parameter of a generator of the GAN based at least in part on the determination by the discriminator that the fifth feature data comprises synthetic feature data.

16. The system of claim 13, wherein the instructions, when executed by the at least one processor are effective to program the at least one processor to perform the method further comprising:

sending the second feature data from an output of a first layer of the detector to a multi-layer neural network, wherein the transforming the second feature data from the second domain into the third feature data in the first domain is performed by the multi-layer neural network;

sending, by the multi-layer neural network, the third feature data to a second layer of the detector, the second layer following the first layer; and processing, by the detector the third feature data to generate the second bounding box.

17. The system of claim 13, wherein the instructions, when executed by the at least one processor are effective to program the at least one processor to perform the method further comprising:

training the generator using first training data in a generative adversarial network, wherein the first training data comprises unannotated RGB feature data and unannotated infrared feature data;

coupling the generator to a first layer of the detector, wherein the second feature data is generated by the first layer of the detector; and coupling the generator to a second layer of the detector, wherein the third feature data is sent to the second layer of the detector from the generator.

18. The system of claim 17, wherein the instructions, when executed by the at least one processor are effective to program the at least one processor to perform the method further comprising:

sending, to the detector, an annotated frame of infrared image data;

generating, by the detector, infrared feature data from the annotated frame of infrared image data;

transforming, by the generator, the infrared feature data into synthetic RGB feature data; and updating at least one parameter of the detector without updating a parameter of the generator.

19. The system of claim 18, wherein the instructions, when executed by the at least one processor are effective to program the at least one processor to perform the method further comprising:

sending, to the detector, a second annotated frame of infrared image data;

generating, by the detector, second infrared feature data from the second annotated frame of infrared image data;

transforming, by the generator, the second infrared feature data into second synthetic RGB feature data;

determining, by the detector, a third bounding box surrounding an object-of-interest in the second synthetic RGB feature data;

determining, by the detector, a detection loss by comparing the third bounding box to a fourth bounding box identified by an annotation of the second annotated frame of infrared image data, wherein the detection loss comprises a classification loss and a localization loss;

updating the at least one parameter of the detector based at least in part on the detection loss.

20. The system of claim 13, wherein the instructions, when executed by the at least one processor are effective to program the at least one processor to perform the method further comprising:

sending the second feature data associated with the second domain to a second detector effective to detect objects in the second domain;

determining a second location of the object in the first frame of image data based at least in part on the second feature data; and determining, using non-maximal suppression, that the second location of the object in the first frame of image data is more accurate than the first location of the object in the first frame of image data.

* * * * *